United States Patent
Cannon et al.

(10) Patent No.: US 6,690,941 B1
(45) Date of Patent: Feb. 10, 2004

(54) ADAPTIVE DIGITAL RF COMMUNICATION IN A CORDLESS TELEPHONE

(75) Inventors: Joseph M. Cannon, Harleysville, PA (US); James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/419,483

(22) Filed: Oct. 15, 1999

(51) Int. Cl.$^7$ .................................................. H04Q 7/20
(52) U.S. Cl. .................... 455/462; 455/426.1; 455/465; 370/529
(58) Field of Search ........................... 455/426.1, 422.1, 455/462, 465, 552.1, 553.1; 370/477, 529; 375/220, 219

(56) References Cited

U.S. PATENT DOCUMENTS

| | | | |
|---|---|---|---|
| 5,430,731 A | * | 7/1995 | Umemoto et al. ........... 455/517 |
| 6,256,476 B1 | * | 7/2001 | Beamish et al. ............ 455/522 |
| 6,363,257 B1 | * | 3/2002 | Warwick .................... 455/511 |

* cited by examiner

Primary Examiner—Quochien B. Vuong
(74) Attorney, Agent, or Firm—William H. Bollman

(57) ABSTRACT

A method of transmitting digital data between a base unit and a handset of a cordless telephone includes the step of transmitting a frame including a speech data portion, and a non-speech data portion. In one particular example, the size of the speech data portion and the size of the non-speech data portion are variable. In an alternative embodiment, a cordless telephone includes a base unit, including a codec adapted to convert analog speech data from a far end party to digital samples, a variable encoder adapted to encode the digital samples, and a transceiver adapted to transmit and receive encoded digital samples. The cordless telephone also includes a handset, including a transceiver adapted to transmit and receive encoded digital samples, a controller adapted to act on non-speech data, and a transducer adapted to be responsive to speech data. According to this embodiment, the variable encoder is adapted to encode a speech data portion of a frame based upon a non-speech data portion of the frame. In another alternative embodiment, a frame structure for digital RF communications between a base unit and a handset of a cordless telephone includes a speech data portion, and a non-speech data portion. In one particular example a size of the speech data portion and a size of the non-speech data portion are variable.

11 Claims, 3 Drawing Sheets

| PRE 204 | SYNCH 206 | CMD 208 | SPEECH DATA 604 | NON - SPEECH DATA 606 |
|---|---|---|---|---|

602

US 6,690,941 B1

ADAPTIVE DIGITAL RF COMMUNICATION IN A CORDLESS TELEPHONE

FIELD OF THE INVENTION

This application is directed to the field of telephony, and more particularly to the field of cordless telephones.

BACKGROUND OF THE INVENTION

A cordless telephone comprises a base unit, which is typically stationary and linked to a telephone network, and a handset, which can roam relative to the base unit within a predefined area limited by the range of an RF link between the base unit and the handset. The base unit is typically linked to the network, such as the public switched telephone network, via an interface, such as a telephone line interface.

During an exemplary telephone call, analog audio signals are communicated between the base unit and the network via the telephone line interface. In a digital cordless telephone, received analog signals from a far end party to a telephone call are conventionally converted in the base unit to digitally encoded speech samples for digital communication over the RF link between the base unit and the handset. Conversely, digitally encoded speech samples representing near end speech signals from a party speaking into the handset are converted to analog signals in the base unit for transmission to the far end party via the telephone line interface and the network.

Typically, the digital speech samples transmitted between the base unit and the handset are encoded by an encoding unit, also known as a vocoder, to reduce the bandwidth required to transmit the samples over the RF link. An exemplary vocoder may employ the coding technique known as Adaptive Differential Pulse Code Modulation (ADPCM), which is known to one of skill in the art. The encoded speech samples are also typically transmitted in frames, with each frame including a predetermined number of digital bits associated with the encoded speech samples, and other digital words or bits associated with overhead functions, such as a preamble, error correction, etc.

The RF link between the base unit and the handset is also typically employed to transmit non-speech data therebetween. Examples of non-speech data include display related information transmitted to the handset, such as to instruct the handset to display Caller ID data, ring commands or page commands transmitted to the handset to cause it to produce specific audible sounds, and key press information transmitted to the base unit to inform the base unit of specific handset keys being activated, or to instruct the base unit to implement a particular function associated with the activated keys.

Conventionally, a technique known as the "blank and burst" method is employed for transmitting this non-speech data. According to this method, a control portion of a frame informs the receiving device (i.e., the handset if the base unit is transmitting; or the base unit if the handset is transmitting) that the data portion of the frame contains non-speech data instead of speech data, and the control portion also informs the receiving device of the type of non-speech data. The receiving device thus handles the non-speech data appropriately.

There is a disadvantage, however, in that the blank and burst frame is transmitted in the midst of real-time speech frames associated with an on-going telephone call. This results in an interruption that causes a slight degradation to the speech quality, which may be perceived by the parties engaged in the telephone call, especially if the non-speech frame is transmitted in close proximity to other non-speech frames. There is a need, therefore, for a non-speech data transmission approach that is adaptive to minimize any adverse impact to on-going speech transmissions.

SUMMARY OF THE INVENTION

This need is met by a method of transmitting digital data between a base unit and a handset of a cordless telephone, including the step of transmitting a frame including a speech data portion, and a non-speech data portion. In one particular example, the size of the speech data portion and the size of the non-speech data portion are variable.

In an alternative embodiment, a cordless telephone includes a base unit, including a codec adapted to convert analog speech data from a far end party to digital samples, a variable encoder adapted to encode the digital samples, and a transceiver adapted to transmit and receive encoded digital samples. The cordless telephone also includes a handset, including a transceiver adapted to transmit and receive encoded digital samples, a controller adapted to act on non-speech data, and a transducer adapted to be responsive to speech data. According to this embodiment, the variable encoder is adapted to encode a speech data portion of a frame based upon a non-speech data portion of the frame.

In another alternative embodiment, a frame structure for digital RF communications between a base unit and a handset of a cordless telephone includes a speech data portion, and a non-speech data portion. In one particular example a size of the speech data portion and a size of the non-speech data portion are variable.

BRIEF DESCRIPTION OF THE DRAWING

Objects and advantages of the invention will be apparent to one of skill in the art upon review of the following detailed description in light of the drawing, wherein.

DETAILED DESCRIPTION

Figure 1:
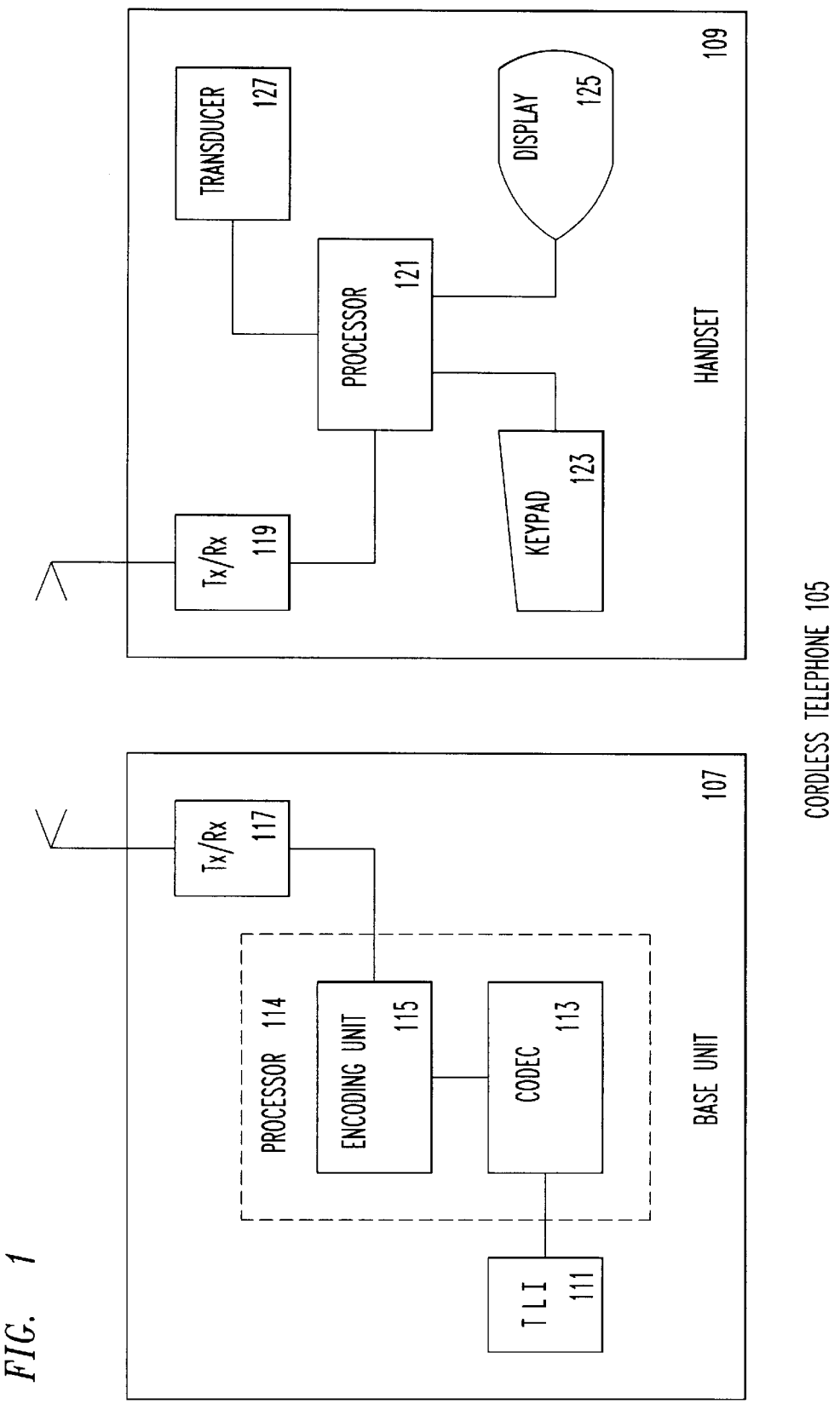
FIG. 1 is a simplified block diagram of a cordless telephone adapted to operate according to the invention.

FIG. 1 is a simplified block diagram of a cordless telephone 105, including a base unit 107 and a handset 109. Base unit 107 includes a telephone line interface 111, a codec 113, an encoding unit 115, and a transceiver 117. Handset 109 includes a transceiver 119, a processor or controller 121, an input element, such as a keypad 123, a display 125 and a transducer, such as a speaker, 127. From a block diagram perspective, cordless telephone 105 is the same as a conventional cordless telephone. However, programming within a processor, such as a digital signal processor 114 that may also include the codec 113 and the encoding unit 115 is particularly adapted according to the invention. Further, programming within processor 121, which also includes a codec and an encoding/decoding unit, and may also be, for example, a digital signal processor, is particularly adapted according to the invention.

Figure 2:
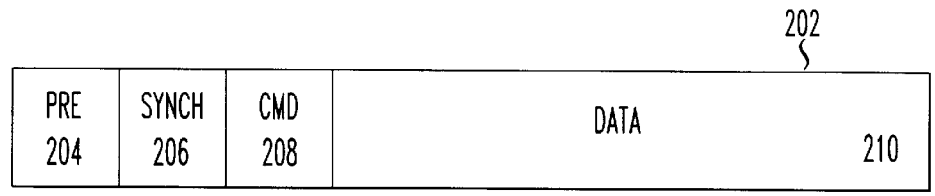
FIG. 2 is a diagram of a digital communications frame structure for communication between a base unit and a handset of a cordless telephone.

To facilitate an understanding of the invention, FIG. 2 provides a diagram of a conventional frame structure for digital transmission over an RF link between the transceivers 117 and 119. This exemplary frame 202 includes a preamble 204, which may be, for example, a 16 bit word, a synchronization word 206, which may also be 16 bits in length, a command word 208, which may also be 16 bits in length, and a data portion 210, which may be, for example, 160 bits in length. In a particular embodiment of a cordless telephone based on the DSP 1609 available from Lucent Technologies, Inc., when the RF link is present, every 5 ms a frame similar to frame 202 is transmitted from the base unit 107 to the handset 109, and another frame is transmitted from the handset 109 to the base unit 107.

The simplified frame structure of the exemplary frame 202 may also include additional words or bits, depending on the particular application and the design choices involved. For example, the frame 202 may also include a cyclic redundancy check (CRC) word of, for example, 16 bits, and may also include a plurality of bits allocated to forward error correction (FEC). The FEC bits may be together in a word form, or may be interleaved among the bits in data portion 210.

The preamble 204, synchronization word 206 and command word 208 are exemplary overhead portions and/or control portions of a frame, and are well known to one of skill in the art. For example, the preamble and synchronization word may be used for timing functions, such as for timing recovery, and the command word may be employed to provide the receiving device with some information regarding the data in the data portion 210. As mentioned above, additional bits may be employed for additional purposes, such as error correction, at the discretion of one of skill in the art.

Figure 3:
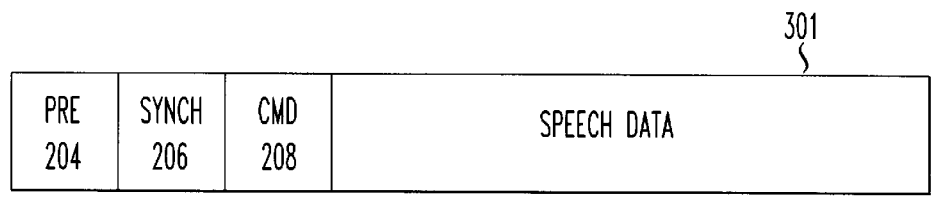
FIG. 3 is an example of the frame structure of FIG. 2.
Figure 4:
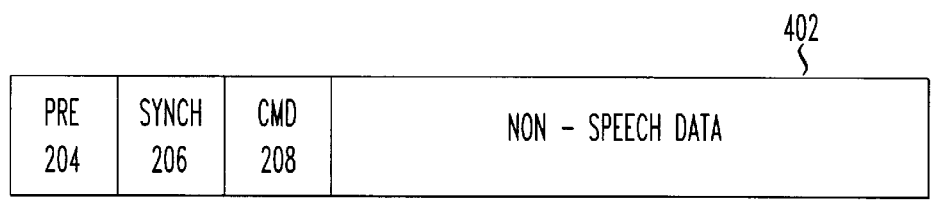
FIG. 4 is another example of the frame structure of FIG. 2.
Figure 5:
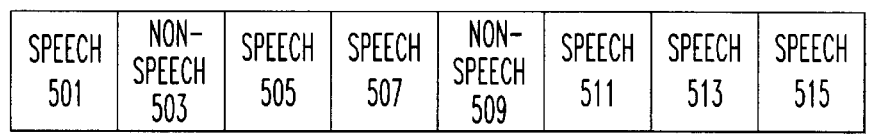
FIG. 5 is an exemplary depiction of a plurality of frames, such as those shown in FIGS. 2 and 3.

Conventionally, the data portion 210 comprises speech data, such as ADPCM encoded data, as shown in FIG. 3 as frame 301. Sometimes, however, by way of the conventional blank and burst method, the data portion 210 may comprise non-speech data, as shown in FIG. 4 as frame 402. FIG. 5 shows a series of frames wherein some of the frames, such as frames 501, 505, 507, 511, 513 and 515 are speech data frames 301, while other frames 503 and 509 are non-speech data frames 402. A problem of this conventional approach occurs when the frames 503 and 509 are processed, in that the user may be able to perceive the blank space is the speech, especially if there are multiple non-speech data frames 402 in close proximity.

Figure 6:
FIG. 6 is a diagram of an alternative digital communications frame structure for communication between a base unit and a handset of a cordless telephone according to the invention.

According to the invention, the processor 114 establishes a new frame, as shown in FIG. 6 as frame 602, wherein the data portion 210 includes both a speech data portion 604 and a non-speech data portion 606. The speech data portion 604 includes fewer bits dedicated to speech data than exists in conventional speech data frame 301, but includes more bits dedicated to speech data than exist in the conventional non-speech data frame 402. For example, the speech data portion may have fewer bits by reducing in number or eliminating any error correction bits incorporated into the data portion, or by employing a lower bit rate speech coder. Thus, according to the invention, a speech data portion will be present in most, if not all, frames. This results in some periodic and less perceptible degradation of the speech signal, and advantageously eliminates any total gaps in a continuous stream of speech data frames caused by a frame that completely lacks speech data.

In the exemplary frame 602, the speech data portion 604 and the non-speech data portion 606 are the same size, i.e., roughly one half the size of the data portion 210 (allowing for some added overhead bits, each "half" may in fact be slightly less than one half the size of data portion 210). This is purely by way of example, and not of limitation. It is also envisioned to be within the scope of the invention that the relative sizes of the speech data portion 604 and the non-speech data portion 606 may vary. The variation may be based, for example, on the amount of non-speech data available for transmission.

The encoding scheme employed for the speech data portion may be adaptive, and may be selected based on the amount of non-speech data in the non-speech data portion 606, which dictates the amount of space available for the speech data portion. Alternatively, the number of bits of resolution associated with the encoded speech data my be adjusted, such as by dropping one or more least significant bits, to adjust the size of the speech data portion to fit within an area of data portion 202 that is remaining once the size of the non-speech data portion 606 is established.

The adaptive coding scheme may take many forms, either alone or in combination. For example, multiple speech coders may be employed, such that the adaptive function is accomplished by simply switching to a different coder. Alternatively, the same speech coder may be employed, but with multiple bit rates, such that the adaptation is accomplished by changing the bit rate. Another option is to have the FEC or CRC features vary, such that some frame can have both FEC and CRC, others have only one of these, and others have neither of these. Further, the number of bits devoted to FEC and/or CRC may be variable. Many of these selections may be made based on the application and particular characteristics of the environment, such as the noise level and the received signal strength. Similarly, the use of FEC or other error correction may be applied to only the speech data, such that the non-speech data is not error protected, is protected to a lesser degree, or is protected via a different scheme.

Figure 7:
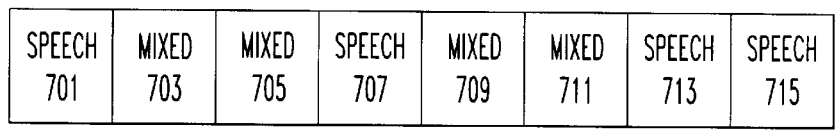
FIG. 7 is an exemplary depiction of a plurality of frames according to the invention.

FIG. 7 shows a series of frames that may be contrasted with the series of frames in FIG. 5. In FIG. 7, the first frame 701 is a speech data frame, and may be considered the same as frame 501 in FIG. 5. Frames 703 and 705, however, are mixed frames (i.e., having both speech data and non-speech data, such as in frame 602), and may be contrasted with frames 503 and 505, which are respectively a non-speech data frame and a speech data frame. Similarly, speech frame 707 may be compared favorably with speech frame 507, and mixed frames 709 and 711 may be contrasted with non-speech frame 509 and speech frame 511, while frames 713 and 715 are compared favorably with frames 513 and 515.

Figure 8:
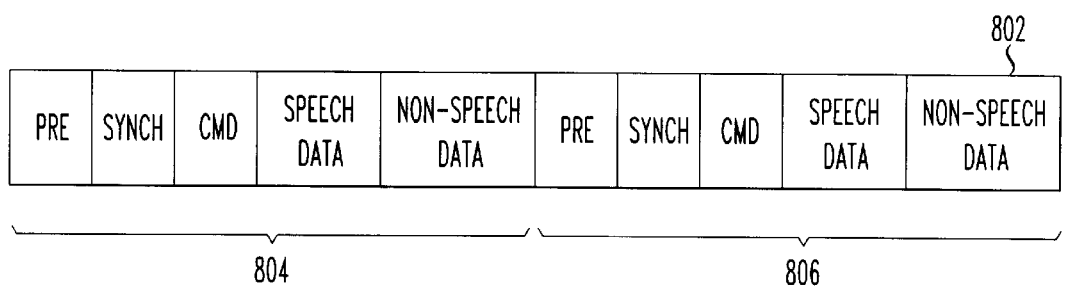
FIG. 8 is an exemplary diagram of a pair of subframes, each configured similarly to frame 602, incorporated into the same frame.

In the exemplary embodiment of FIG. 8, a frame 802 comprises two subframes 804 and 806. One of the subframes 804, 806 is for communication from the base unit 107 to the handset 109, while the other subframe is for communication from the handset 109 to the base unit 107. According to the invention, each of the subframes 804, 806 may be a mixed subframe analogous to frame 602. Further each subframe 804, 806 may have variably sized speech data portions and non-speech data portions, where the sizes in one of the subframes need not be the same as the sizes in the other subframe.

It is also possible that the encoding scheme or resolution associated with one subframe may be different from the encoding scheme or resolution associated with the other subframe. Thus, for example, the codec 113 and/or encoder 115 in processor 114 may be adapted differently from like components in processor 121. The different encoding schemes and resolutions may be varied in general, or may be adapted to vary on a frame-by frame basis depending, for example, on the amount of non-speech data available for transmission.

In the above description, the codec 113 and encoder 115 are illustrated with respect to processor 114 in base unit 107 for use in enabling digital RF communication from the base unit 107 to the handset 109. Similar devices are also part of processor 121 in handset 109 for use in enabling digital RF communication from the handset 109 to the base unit 107.

Based on an understanding of these various embodiments, one of skill in the art is likely to conceive of alternative embodiments that are not specifically enumerated here, but that are clearly within the scope of the invention.

What is claimed is:

1. A method of transmitting digital data between a base unit and a handset of a cordless telephone, comprising:

transmitting a single data frame including both a speech data portion, and a non-speech data portion;

wherein the single data frame is transmitted in a single channel; and wherein the non-speech data portion is comprised of at least one of display related information, Caller ID data, ring commands, page commands and key press information.

2. A method as recited in claim 1, wherein:

a size of the speech data portion and a size of the non-speech data portion are each variable.

3. A method as recited in claim 1, wherein:

a size of the speech data portion plus a size of the non-speech data portion does not exceed a predetermined threshold.

4. A method as recited in claim 1, further comprising:

providing an indication in the single data frame regarding a size of the non-speech data portion.

5. A method as recited in claim 1, further comprising:

selecting an encoding protocol of the speech data portion based on a size of the non-speech data portion.

6. A frame structure for digital RF communications between a base unit and a handset of a cordless telephone, comprising:

a speech data portion in a first payload portion of a single data frame; and a non-speech data portion in a second payload portion of the single data frame;

wherein the speech data portion and the non-speech data portion are both transmitted in a the single data frame of a single channel; and wherein the non-speech data portion is comprised of at least one of display related information, Caller ID data, ring commands, page commands and key press information.

7. A frame structure as recited in claim 6, wherein:

a size of the speech data portion and a size of the non-speech data, portion are each variable.

8. A frame structure as recited in claim 7, wherein:

a size of the speech data portion is based inversely on a size of the non-speech data portion.

9. A frame structure as recited in claim 8, wherein:

a selection of an encoding protocol associated with the speech data portion is based on the size of the speech data portion.

10. A frame structure as recited in claim 6, wherein:

the first encoding protocol is based on a size of a non-speech data portion of the first subframe; and the second encoding protocol is associated with a size of a non-speech data portion of the second frame.

11. A frame structure as recited in claim 6, wherein:

the first encoding protocol is different from the second encoding protocol.

* * * * *